United States Patent [19]

Biggs et al.

[11] Patent Number: 4,862,175
[45] Date of Patent: Aug. 29, 1989

[54] POLICE RADAR SIGNAL BAND DISCRIMINATION CIRCUITRY FOR A POLICE RADAR WARNING RECEIVER

[75] Inventors: Michael A. Biggs, Mason; James L. Jaeger, Cincinnati, both of Ohio

[73] Assignee: Cincinnati Microwave, Inc., Cincinnati, Ohio

[21] Appl. No.: 162,244

[22] Filed: Feb. 29, 1988

Related U.S. Application Data

[63] Continuation-in-part of Ser. No. 878,055, Jun. 24, 1986, Pat. No. 4,750,215.

[51] Int. Cl.$^4$ ............... H04B 17/00; H04B 1/26; G01S 7/40
[52] U.S. Cl. .................... 342/20; 455/226; 455/315; 455/228
[58] Field of Search ............. 342/20, 103; 455/226, 455/228, 315

[56] References Cited

U.S. PATENT DOCUMENTS 4,313,216  1/1982  Jaeger et al. .
4,581,769  4/1986  Grimsley et al. .

Primary Examiner—Thomas H. Taroza
Assistant Examiner—John B. Sotomayor
Attorney, Agent, or Firm—Wood, Herron & Evans

[57] ABSTRACT

A radar warning receiver is provided having a police radar signal band discrimination circuit which generates evaluation signals, the state of which indicates the voltage level relative a threshold voltage of a discriminator output as the local oscillator is swept through the radar bands. The times during which the evaluation signals are in one state or the other are utilized to identify in which band the received signal is operating (e.g., X-band or K-band).

19 Claims, 2 Drawing Sheets

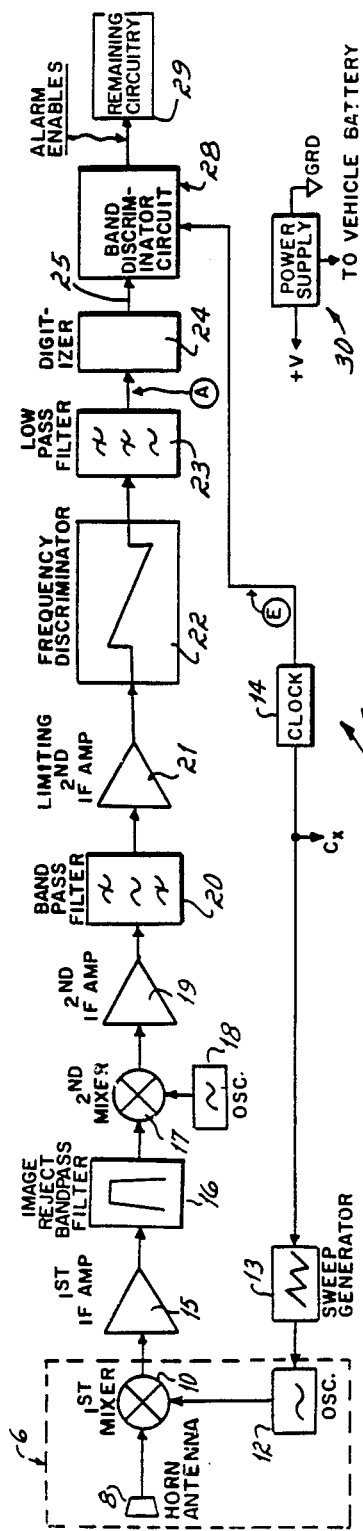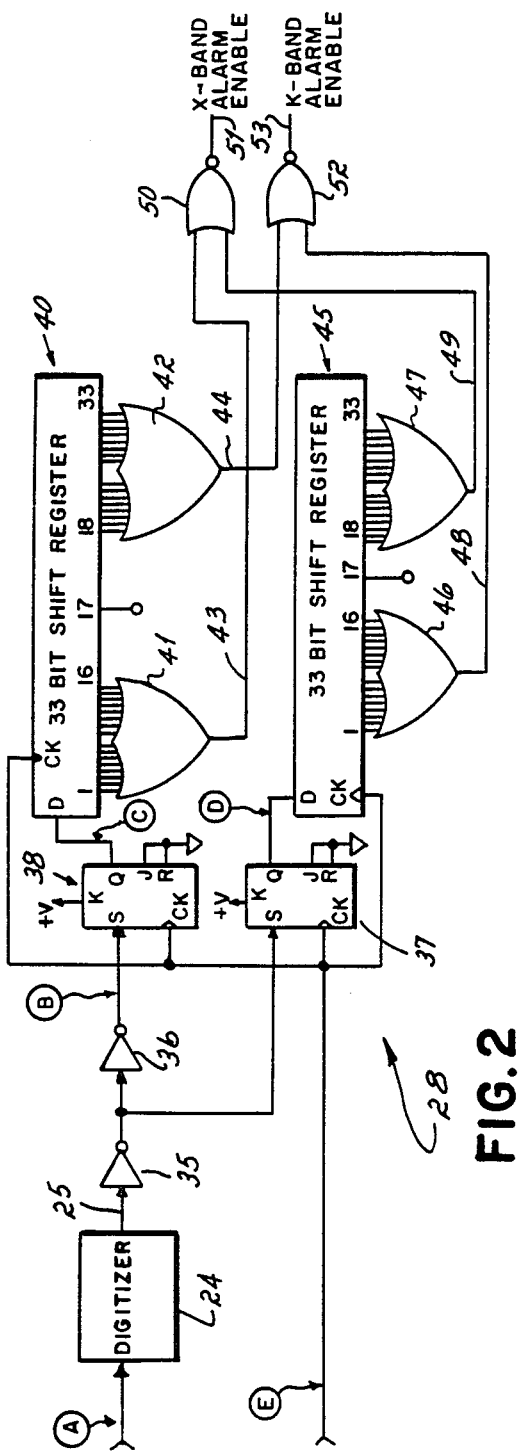

POLICE RADAR SIGNAL BAND DISCRIMINATION CIRCUITRY FOR A POLICE RADAR WARNING RECEIVER

RELATED APPLICATIONS

This application is a continuation-in-part of copending U.S. patent application Ser. No. 878,055, entitled "Police Radar Signal Detection Circuitry For A Police Radar Warning Receiver", filed June 24, 1986, now U.S. Pat. No. 4,750,215 and assigned to the assignee herein.

BACKGROUND OF THE INVENTION

I. Field of the Invention

The present invention is directed to an improvement in vehicle-mounted police radar warning receivers, and more particularly to such a receiver which can indicate the band in which the police radar is operating.

II. Description of the Prior Art

Police radar typically operates in one of two bands, e.g., either the X-band or the K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is at a fixed frequency within the selected band.

An electronic assembly referred to as a police radar warning receiver has been devised to detect the presence of police radar signals. The receiver is mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. The receiver is contained in a box-like housing which is set on the dash or clipped to the visor in the vehicle. Extending from the rear of the housing is a power cord which terminates in a plug adapted to be received in the cigarette lighter socket of the vehicle. The front panel of the receiver faces the driver and has various indicators and control knobs.

When police radar is operating within range of the radar warning receiver, the circuitry of the receiver is able to detect the presence thereof. The ESCORT and PASSPORT radar warning receivers, manufactured by the assignee herein, Cincinnati Microwave, Inc. of Cincinnati, Ohio, utilize a superheterodyne circuit for this purpose.

As explained in aforementioned U.S. Pat. Nos. 4,313,216, and 4,581,769, which is also assigned to the assignee herein, a superheterodyne circuit employs two local oscillators, one of which sweeps in frequency over a range of frequencies related to one or both radar bands. A first local oscillator may generate first and second oscillator signals which are mixed with signals present at the antenna. If the signals at the antenna are incoming police radar or other signals from either the X-band or the K-band, the oscillator signals mix therewith to produce signals in the passband of a first IF. The first oscillator signal may, for example, sweep from about 11.6 GHz to about 11.5 GHz while the second oscillator signal, which is preferably quasi harmonically related to the first, is sweeping from about 23.2 GHz to about 23.0 GHz. Police radar signals are typically transmitted in either the X-band at approximately 10.525 GHz or the K-band at approximately 24.150 GHz. Hence, X-band police radar signals are lower in frequency relative the first oscillator signals by a selected amount, while K-band police radar signals are higher in frequency relative the second oscillator signals by that selected amount. This relationship may be referred to as high side injection for X-band signals and low side injection for K-band signals and results in sweeping IF product signals which are centered at approximately 1.03 GHz upon receipt of either X- or K-band signals.

The sweeping IF product signals are then mixed with an oscillator signal from a second local oscillator, preferably at about 1.03 GHz, to produce signals in the passband of a second IF, which signals are then passed through a discriminator circuit to provide output pulses if a signal in either the X-band or the K-band was present at the antenna. As is understood, such a second heterodyning process will result in generation within the receiver of a pair of second IF signals, one the result of the sweeping first IF product crossing 1.04 GHz (the primary frequency) and the other the result of crossing 1.02 GHz (the image frequency). The discriminator will similarly generate a pair of pulses for each police radar signal received, one pulse related to the 1.04 GHz response (primary) as well as another pulse related to the 1.02 GHz image response (image).

As described in aforementioned U.S. Pat. No. 4,313,216, it is possible to determine whether the received radar signal is in the X-band or K-band based upon the timing or "spacing" between the primary and image pulses, e.g., the primary and image pulses resulting from receipt of X-band signals are spaced further apart than such pulses resulting from receipt of K-band signals. Some radar warning receivers may discriminate between X-band and K-band radar signals by using selected local oscillator frequencies to generate IF signals which are in one of two ranges depending upon the frequency of the received police radar signal. Thus, the passband of the IF may be increased and is therefore referred to herein as a spread IF approach. With the spread IF approach, the band may be determined by knowing in which of the two ranges the IF signal appears. The spread IF approach may also generate primary and image pulses although their spacing may no longer be relevant.

In order to improve sensitivity, and particularly with respect to superheterodyne receivers, to reduce noise, it has been known to provide an image reject filter in front of the second mixer to thereby filter out the image signal prior to the discriminator. However, this technique has not generally been available for police radar warning receivers because such a filter could preclude the possibility of band discrimination. For example, in the circuitry of the ESCORT and PASSPORT radar warning receivers, the "spacing" between primary and image pulses is utilized to determine the band as described in aforementioned U.S. Pat. No. 4,313,216, the disclosure of which is incorporated herein by reference. Filtering out the image signal (i.e., passing only the primary signal) would prevent generation of an image pulse thus inhibiting the ability to discriminate between bands by monitoring the spacing between primary and image pulses. In the spread IF approach, the image frequency is moving. Hence, an image reject filter, which has a fixed center frequency would not be useful. Some filters such as tunable YIG filter may provide a tracking image reject filter. Such a filter would be prohibitively complex and expensive to be employed in a consumer product such as a police radar warning receiver.

Additionally, many radar warning receivers adapted to indicate the band in which the police radar is operating will not always be able to determine whether the police radar signal is in the X- or the K-band, for example. This may be due, in some instances, to the presence of the image signal. Hence, it is desirable, if possible, to filter the image signal although this has not heretofore been advisable in a radar warning receiver as discussed. In any event, because it may be difficult to determine which band the police radar signal is in, some radar warning receivers may select one or the other band such as by default. This might lead to loss of intelligible information to the driver or user.

SUMMARY OF THE INVENTION

The present invention provides circuitry for a radar warning receiver which can utilize an image reject filter while still discriminating the band in which the police radar signal is received. Moreover, the present invention provides circuitry for a radar warning receiver which enhances the ability to accurately determine the band in which the police radar signal has been received. Characteristically, discriminator output pulses are S-shaped (hence, they may be referred to as S-curves) with one portion above a threshold or reference voltage (up phase) and a second portion below the threshold (down phase) with at least one threshold crossing therebetween. In one band, for example, the X-band, an up phase followed by a down phase will result from the primary while a down phase followed by an up phase will result from the image. Because X-band is high side injection with respect to the sweeping local oscillator and K-band is low side injection with respect to the sweeping local oscillator, the converge will occur in the other band. That is, in the K-band, for example, a primary will result in a down phase followed by an up phase while an image will result in an up phase followed by a down phase. By filtering out one of the responses, for example, the 1.02 GHz image response, only the primary will remain. Thus, reception of a police radar signal by a receiver with an image reject filter according to the present invention will result in an up phase followed by a down phase, each of which will occur for at least a predetermined time and which will be separated by essentially only one threshold crossing upon receipt of a police radar signal in one band (e.g., the X-band) while the opposite sequence will occur upon receipt of a police radar signal in the other band (e.g., the K-band). To this end, the present invention provides circuitry which (i) generates evaluation signals, the state of which indicates the voltage level relative to a threshold of the discriminator output as the local oscillator is swept through the radar bands; and (ii) evaluates the phase relationship of the discriminator output pulse as indicated by the state of the evaluation signals. In response to a police radar signal in one band, the evaluation signals will be in the first state throughout a first predetermined time and in the second state throughout a second predetermined time, the second predetermined time beginning a third predetermined time after the first predetermined time ends. In response to a police radar signal in the other band, the evaluation signals will be in the second state throughout the first predetermined time and in the first state throughout the second predetermined time.

By virtue of the foregoing, it is now possible to utilize an image reject filter in a radar warning receiver. Additionally, the ability to determine the band in which the police radar signal is operating is enhanced.

BRIEF DESCRIPTION OF THE DRAWINGS

The several objectives, advantages and features of the present invention will become more readily apparent from the following detailed description taken with the accompanying drawings wherein like reference numerals apply to like structure and in which:

FIG. 1 is a block diagram of a radar warning receiver according to the principles of the present invention;

FIG. 2 is a schematic representation of a preferred embodiment of the band detection circuitry of the present invention.

DETAILED DESCRIPTION OF THE DRAWINGS

Figure 3:
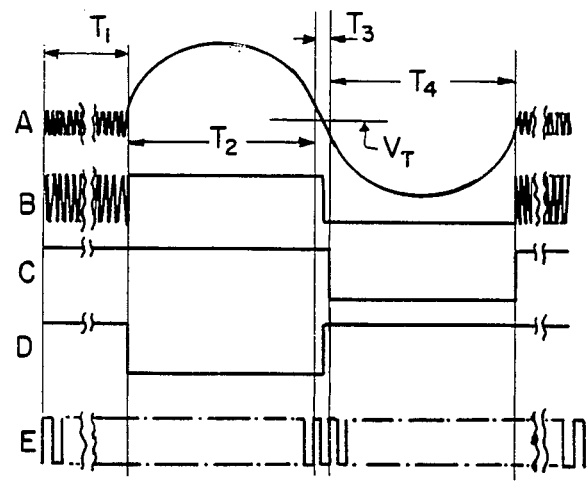
FIGS. 3 and 4 are waveforms for explaining the principles of operation of the present invention.

With reference to FIG. 1, there is shown a block diagram of a radar warning receiver 5 according to the principles of the present invention. Pulsed or continuous signals occurring in the X-band or K-band are received by an antenna system 6 which includes horn antenna 8 coupled to first mixer 10 to which the signals received by horn antenna 8 are directed. Horn antenna 8 may include filters for preventing signals at unwanted frequencies from being passed to first mixer 10, and it may further include other filters for preventing outward radiation therefrom of internally generated radio frequency signals. Coupled to first mixer 10 is a variable frequency first local oscillator 12 adapted to be swept in frequency over a range of frequencies as described in aforementioned U.S. Pat. No. 4,313,216, the disclosure of which is incorporated herein by reference. As explained in aforesaid U.S. Pat. No. 4,313,216, oscillator 12 is adapted to generate a pair of swept oscillator signals, one correlated to the X-band (the fundamental frequency) and one correlated to the K-band (the second harmonic frequency). First mixer 10 and first local oscillator 12 may be built into and made a part of antenna system 6 as described in U.S. Pat. No. 4,613,989, assigned to the assignee herein, the disclosure of which is incorporated herein by reference. The oscillator disclosed in U.S. Pat. No. 4,583,057, also assigned to the assignee herein, may be utilized for local oscillator 12. The disclosure of said U.S. Pat. No. 4,583,057 is incorporated herein by reference.

The frequency of the two oscillator signals generated by local oscillator 12 vary, i.e., they are swept, across two predetermined bands of frequencies by a sweep generator 13 under control of a system clock 14 to be described hereafter. The varying frequency signals generated by local oscillator 12 are mixed with received signals from horn antenna 8 in first mixer 10 to generate first IF signals as explained in aforesaid U.S. Pat. No. 4,313,216.

The first IF signals are coupled to first IF amplifier 15. The output of amplifier 15 is coupled to an image reject bandpass filter 16. As explained in aforesaid U.S. Pat. No. 4,313,216, the first IF is preferably operating at about 1.03 GHz. Thus, the primary and image signals in the first IF will be approximately 1.04 GHz and 1.02

GHz, respectively. Filter 16 is adapted to filter out or reject the image IF signal at 1.02 GHz while passing the primary IF signal at 1.04 GHz. While this is preferred, the opposite relationship could be utilized (e.g., filter 1.04 GHz and pass 1.02 GHz). While filter 16 has been breadboarded using conventional LC components, it is preferred that filter 16 be a Surface Acoustic Wave (SAW) filter with a nominal 2 MHz bandwidth, a nominal 1.04 GHz (primary) center frequency, a tuned insertion loss of no more than 10 dB maximum at the center frequency, and a 50 dB minimum selectively at 1.02 GHz (image) relative to attenuation at the center frequency.

The output of filter 16 is coupled to second mixer 17 whereat the filtered first IF signal is mixed with a fixed frequency oscillator signal from second local oscillator 18 to produce a second IF signal which is amplified by second IF amplifier 19. The output of amplifier 19 is coupled through bandpass filter 20 and limiting second IF amplifier 21 to frequency discriminator circuit 22. The output of discriminator 22 is coupled to low pass filter 23 which preferably has a corner frequency of less than 8 KHz and more preferably about 6 KHz. Operation of the foregoing, with the exception of filter 16 and its effect, is generally as described in aforesaid U.S. Pat. No. 4,313,216.

Representative output signals from low pass filter 23 are shown in curves A of FIGS. 3 and 4 for received X-band and K-band signals, respectively, as will be discussed. Filter 23 output signals will vary in voltage level above and below a predetermined threshold voltage $V_T$. These signals are coupled to digitizer 24 which produces signals referred to herein as evaluation signals on output 25. Digitizer 24 is preferably a symmetrical non-inverting limiter and produces evaluation signals which, at any given time, will preferably be in one of two states. The two states are defined as logic levels "1" and "0" (or high and low, respectively) corresponding to the positive power supply voltage (+V) and ground, respectively. For the evaluation signal to be in the first state (logic "1" or high), the input to digitizer 24 must be above $V_T$. Similarly, the evaluation signal will be in the second state (logic "0" or low) when the input to digitizer 24 is below $V_T$.

The evaluation signals on output 25 are coupled to band discriminator or detector circuit 28 which, in cooperation with signals from clock 14, is adapted to determine whether the received signal is in the X-band or the K-band. Only when the received signal is in one of those bands is an alarm enable signal to be generated to the remaining circuitry 29 which preferably contains circuitry to generate audible and visual alarms indicative of reception of a police radar signal and the band.

With further reference to FIG. 2, there is shown a schematic representation of a preferred embodiment of band discriminator circuit 28. Output 25 of digitizer 24 is coupled (i) through a first inverter 35 to a first J-K flip-flop or latch 37 and (ii) through inverter 35 and second inverter 36 to second J-K flip-flop or latch 38. Thus, the output of inverter 35 (S input to latch 37) will be at a logic level opposite that of output 25 while the output of inverter 36 (S input to latch 38) will be at the same logic level as output 25.

The Q output of latch 38 is coupled to the input of a first 33 bit shift register 40, with the first 16 bits or outputs thereof wire-OR'd together (as represented by OR gate 41) and the last 16 bits or outputs thereof similarly wire-OR'd together (as represented by OR gate 42). Output 17 is a "don't care" bit as will be explained.

Similarly, the Q output of latch 37 is coupled to the input of a second 33 bit shift register 5, the outputs of which are similarly OR'd as represented by OR gates 46 and 47, respectively. As is readily recognized by those of ordinary skill of the art, registers 40 and 45 may each comprise two sixteen bit registers (not shown) for bits 1–16 and 18–73, respectively, and a flip-flop or the like (not shown) for bit 17.

Output 43 of OR gate 41 ad output 49 of OR gate 47 are NOR'd by gate 50 to generate on output 51 a X-band alarm enable signal as ill be described hereafter. Similarly, output 44 or OR gate 42 and output 48 of OR gate 46 are NOR by gate 52 to generate on output 53 a K-band signal alarm enable as will also be described hereafter. Outputs 51 and 53 are utilized to drive remaining circuitry 29 which includes alarm drivers and the like (not shown) indicative of whether a police radar signal received at horn antenna 8 is in the X-ban or the K-band. Discriminator 28 may also be utilize to discriminate between pulsed or continuous signals from a fixed frequency source (e.g., police radar and such signals from a variable frequency source e.g., non-police radar) as disclosed in the parent application hereto, U.S. patent application Ser. No. 878,055, the disclosure of which is incorporated herein by referenced. The present invention, however, eliminates the need for alarm enable system 55 shown in FIG. 4 of the aforesaid parent application.

Operation of the circuit of FIG. 2 will now be explained with reference to the waveforms of FIGS. 3 and 4. As can be seen in FIG. 2, latches 37 and 38 and registers 40 and 45 are operated under control of a clock signal (waveform E in FIGS. 3 and 4) from clock 14. Clock signal E is preferably at 65.536 KHz while the clock signal $C_X$ driving sweep generator 13 provides a short pulse at about an 8 Hz rate (i.e., oscillator 12 will sweep through its band eight times every second). Thus, the output of digitizer 24 (the evaluation signals generated during each sweep of oscillator 12) is sampled more than 8,000 times each sweep as is represented by the clock pulses of waveform E of FIGS. 3 and 4.

Figure 4:
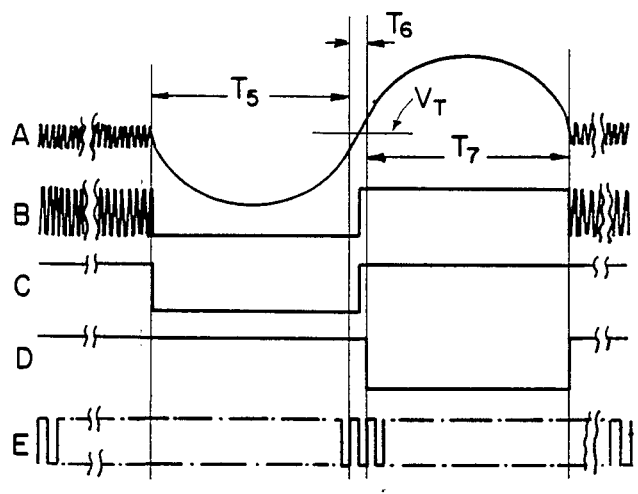

Waveform A of FIG. 3 represents the output of low pass filter 23 when a police radar signal in the X-band is detected while waveform A of FIG. 4 represents the output of low pass filter 23 when a police radar signal in the K-band is detected. Although the signal being detected is, for purposes of one sweep of oscillator 12, a CW or continuous wave signal, the action of first local oscillator 12 in generating signals which sweep or vary in frequency, and the subsequent mixing of the resulting first IF signals with the second local oscillator signal generates IF signals which "sweep past" the center frequency of the discriminator circuit at a rate determined by sweep generator 13.

Therefore, discriminator 2 senses a signal which is continuously changing in frequency. Thus, waveform A of FIGS. 3 and 4 illustrate the output of the frequency discriminator after it has been filtered by filter 23 wherein the random noise passing through limiting second IF amplifier 32 is finally blanked an input signal "captures" the emitter, and until occurs, the output of the discriminator is a signal which varies at a random rate above and below threshold $V_T$.

When a signal captures limiter 21, discriminator 22 output will then vary above and below the threshold voltage $V_T$. With the frequencies of oscillators 12 and 18 selected as described in aforesaid U.S. Pat. No. 4,313,216 and with image reject filter 16 as preferred, only the primary of the IF signal will appear at discriminator 2.2. Hence, upon detection of an X-band police radar signal, the output of discriminator 22 will first increase above $V_T$ as the primary is captured, then decrease to pass through and below VT as the signal moves through bandpass filter 20, until it reaches the limits of discriminator 22 at which point discriminator output returns to noise (FIG. 3A). Similarly, upon detection of a K-band police radar signal, discriminator 22 output first decreases below $V_T$, then increases past and above $V_T$, and the: returns to noise (FIG. 4A). Note that the opposite relationship would be present if filter 16 passed the image at 1.02 GHz and rejected the primary at 1.04 GHz.

Limiting second IF amplifier 21, frequency discriminator 22 and the bandpass filter 20 form a frequency-to-voltage converter for converting the radio frequency input signals to a voltage which changes at a rate proportional to &he rate of change of frequency in the signals. The response bandwidth of this combination of elements is less than the range of frequencies through which the input signals, i.e., the frequency of the first IF signal, are varied.

Low pass filter 23 is coupled to the output of the discriminator 22 and reduces the noise component output thereof. However, the discriminator output signals will remain substantially the same, and therefore signals representing detection of the detected signals by second mixer 16 will be substantially larger than the noise level.

The output of filter 23 is digitized as before-mentioned to produce a digital; logic compatible signal as shown in waveforms B of FIGS. 3 and 4 When latches 37 and 38 are configure as shown in FIG. 2, if the Q input is high, or logic "1", during any portion of a clock cycle, output will be latched high for that cycle. Only if the Q input thereof is low throughout the clock cycle will output Q be low. Thus, if during a clock cycle, the input to digitizer 24 includes noise (time $T_1$), the output Q of latches 37 and 38 would both be high. If the discriminator signal were in its up phase portion time $T_2$ in FIG. 3 or $T_7$ in FIG. 4), output Q of latch 38 would be high and output Q of latch 37 would be low as shown in waveforms C and D, respectively, FIGS. 3 and 4. Conversely, if the discriminator output were in its down phase portion, as in time $T_4$ of FIG. 3 or $T_5$ of FIG. 4, latch 38 output would be low and latch 37 output would be high as also shown i: said respective waveforms C and D of FIGS. 3 and 4. However, during only one clock cycle between the up phase and down phase portions of the discriminator output, the input to both latches 37 and 38 will be high for some period of time thus producing a high from both latches (see times $T_3$ of FIG. 3 and $T_6$ of FIG. 4).

As will be appreciated, the outputs of latches 37 and 38 indicate the status of the input signal to digitizer 24. That is, if the outputs are investigated at the end of a clock cycle and if both are high, that would indicate noise or a threshold crossing from discriminator 22, whereas if one latch is low, it will be possible to know which portion of the discriminator output is occurring during that clock cycle by which latch is high. A police radar signal within the sensitivity of receiver 5 will produce a logic "1" from latch 38 and a logic "0" from latch 37 for at least a different sixteen clock cycles and the inverse for at least a different sixteen clock cycles with but one clock cycle therebetween for a threshold crossing (or more than one if the signal is very weak or noisy, but all within the single clock cycle). The sequence of occurrence thereof is indicative of whether the signal is X-band or K-band. Thus, where the signals on output 25 of digitizer 24 are in only a first state throughout a first predetermined time interval and, beginning a second predetermined time interval after the first time interval ends, the signals on output 25 are in only a second state throughout a third predetermined time interval, the received signal may be deemed a police radar signal in the X-band whereas if the opposite occurs, the received signal may be deemed a police radar signal in the K-band.

To accomplish the time record comparison necessary to discriminate between bands, registers 40 and 45 are preferably provided. Each output Q of a respective latch 37 and 38 is clocked into a respective register 45 and 40. After thirty-three clock cycles, and throughout the remaining clock cycles of one sweep of oscillator 12, certain coincidences of signals from registers 40 and 45 will indicate whether a police radar signal has been received.

As each sweep progresses, all outputs 43, 44, 48 and 49 will typically be high. As the sweep progresses, output 25 is initially driven by noise from filter 23 (i.e., output 25 is rapidly switching between high and low) during each clock cycle. Hence, until a signal within the passband of receiver 5 is received at horn antenna 8, the inputs to registers 40 and 45 will typically remain high and so, too, will all thirty-three respective outputs. An occasional low is statistically possible, but will not likely occur often enough to cause a change in outputs 43, 44, 48 and 49 which, therefore, will remain high. Consequently, outputs 51 and 53 will remain low. When a police radar signal is received at horn antenna 8, the Q outputs of latches 38 and 37 will be as shown in waveforms C and D of FIG. 3 or FIG. 4 as described above.

When an X-band signal is received, all inputs to register 40 will still be high during time T2, but the serial inputs to register 45 will be low. Hence, at the end of time T2, output 48 will go low. However, outputs 43, 44 and 49 will still be high precluding generation of an X-band or K-band alarm enable signal by NOR gates 51 and 52. One clock cycle later ($T_3$), bit 1 of register 40 will again be high due to the threshold crossing which occurred therein. For the same reason, bit 1 of register 45 will go high. During time $T_4$, output 25 will be low (because the output of filter 23 is in the down phase portion). Hence, sixteen clock cycles after the end of time $T_3$, bits 1–16 of register 40 and bits 18–33 of register 45 will be low thereby causing outputs 43 and 49 to both be low thus generating a high or X-band alarm enable on output 51.

To accommodate the threshold crossing, one clock cycle must be included in between which cycle is to preferably be ignored. Hence, the output of bit 17 need not be interrogated. At the end of the thirty-third clock cycle, output 51 will go high thereby indicating that an X-band police radar signal was received.

When a K-band signal is received, (times $T_5$ to $T_7$ of FIG. 4), the opposite situation will occur. That is, outputs 44 and 48, but not both of outputs 43 and 49, will be low after the thirty-third clock, thus causing a high or K-band alarm enable signal on output 53. As will be appreciated from the foregoing, therefore, the circuitry of FIG. 2 may be utilized to generate an indication of the band of a received police radar signal.

As explained in the parent application hereto, variable frequency signals such as FSK signals may be operating in the same band as a police radar signal. Receipt of such an FSK signal will cause the output of filter 23 to have more than one threshold crossing between the up phase and down phase portions. More specifically, at least one such crossing will occur outside the time of single clock cycle $T_3$ or $T_6$ and usually in an adjacent clock cycle. Hence, there will not be a sequence like that generated by a police radar signal as discussed above. Rather, during one of times $T_2$ and $T_4$ (or one of times $T_5$ and $T_7$), output Q of latches 37 and 38 will both be high thereby precluding either outputs 43 and 49 or outputs 44 and 48, depending upon the nature of the received FSK signal, from being low throughout the relevant time. Hence, neither of gates 50 and 52 will produce a logic "1" output when the received signal is an FSK signal. As is now apparent, and as explained in the parent application hereto, circuit 28 is also a spurious signal discriminator and may be advantageously so-utilized in a radar warning receiver according to the present invention.

The integrated circuits utilized in band discriminator circuit 28 are preferably FM IF subsystem semiconductors available, for example, from Signetics, Inc. of Sunnyvale, Calif.

Radar warning receiver 5 is conventionally powered by the battery of a vehicle (both not shown) through a regulated power supply 30 to provide a source of positive voltage +V. Supply 30 may be on-board the chassis with receiver 5 or in a plug (not shown) adapted to be received within a vehicle's cigarette lighter socket (not shown) as described in U.S. Pat. No. 4,604,529 assigned to the assignee herein. The disclosure of said U.S. Pat. No. 4,604,529 is incorporated herein by reference.

By virtue of the foregoing, there is provided a circuit for a radar warning receiver which can accurately discriminate between police radar signals in the X-band and the K-band and which may advantageously utilize an image reject filter. Additional advantages and modifications will readily appear to those skilled in the art. The present invention in its broader aspects is therefore not limited to the preferred embodiment and illustrated examples shown and described. Accordingly, departures may be made from such details without departing from the spirit or scope of the present invention.

Having described the invention, what is claimed is:

1. A police radar warning receiver adapted to indicate presence in one of at least two bands of a police radar signal, the receiver comprising:
   oscillator means for generating an oscillator signal which is swept in frequency between a first frequency and a second frequency;
   mixer means for mixing said oscillator signal with a signal correlated to a received police radar signal to provide a primary IF signal and an image IF signal;
   filter means for passing one of said image IF and primary IF signals; and
   circuit means responsive to said passed IF signal adapted to indicate reception of the police radar signal and in which band the police radar signal is present.

2. The police radar warning receiver of claim 1 further comprising:
   antenna means for providing to said mixer means said signal correlated to a received police radar signal.

3. The police radar warning receiver of claim 1, said circuit means including:
   discriminator means responsive to said passed IF signal for generating an output signal having a level which varies relative to a threshold in one of a first and a second manner, said first manner defined by said level varying from above said threshold to below said threshold in response to said passed IF signal being generated by mixing said swept oscillator signal with a received police radar signal in a first band, said second manner defined by said level varying from below said threshold to above said threshold in response to said passed IF signal being generated by mixing said swept oscillator signal with a received police radar signal in a second band; and
   means coupled to the discriminator means for indicating that the received police radar signal is in (1) the first band when said level varies in said first manner and (2) the second band when said level varies in said second manner.

4. The police radar warning receiver of claim 1, said circuit means including:
   second oscillator means for generating a second oscillator signal at a predetermined frequency;
   second mixer means for mixing said second oscillator signal with said passed IF signal to provide a second IF signal; and
   second circuit means responsive to said second IF signal to indicate reception of the police radar signal and in which band the police radar signal is present.

5. The police radar warning receiver of claim 4, said second circuit means including:
   discriminator means responsive to said second IF signal for generating an output signal having a level which varies relative to a threshold in one of a first and a second manner, said first manner defined by said level varying from above said threshold to below said threshold in response to said second IF signal being generated by mixing said swept oscillator signal with a received police radar signal in a first band, said second manner defined by said level varying from below said threshold to above said threshold in response to said second IF signal being generated by mixing said swept oscillator signal with a received police radar signal in a second band; and
   means coupled to the discriminator means for indicating that the received police signal is in (1) the first band when said level varies in said first manner and (2) the second band when said level varies in said second manner.

6. A receiver adapted to indicate from which of two bands of frequencies a signal is detected, the receiver comprising:
   oscillator means for generating a first swept oscillator signal and a second swept oscillator signal, said first oscillator signal swept in frequency between a first frequency and a second frequency correlated to a first band of frequencies, and said second oscillator signal swept in frequency between a third frequency and a fourth frequency correlated to a second band of frequencies;
   mixer means adapted to mix said first swept oscillator signal with signals in the first band and said second oscillator signal with signals in the second band for generating a primary IF signal and an image IF signal in response to receipt of a signal in either of the first and second frequency bands;

filter means for passing one of said primary IF and image IF signals;

discriminator means responsive to said passed IF signal for generating an output signal having a level which varies relative to a threshold (1) in a first manner from above said threshold to below said threshold in response to said passed IF signal being generated by mixing said first swept oscillator signal with a received signal in the first band and (2) in a second manner from below said threshold to above said threshold in response to said passed IF signal being generated by mixing said second swept oscillator signal with a received signal in the second band; and means coupled to the discriminator means for indicating that said received signal is in (1) the first band when said level varies in said first manner and (2) the second band when said level varies in said second manner.

7. The receiver of claim 6, said level being a voltage level and said threshold being a threshold voltage.

8. The receiver of claim 6, further including:

second oscillator means for generating a third oscillator signal at a predetermined frequency; and second mixer means for mixing said third oscillator signal with said passed IF signal to provide a further signal to said discriminator means.

9. The receiver of claim 6, said last named means including:

first circuit means coupled to said discriminator means for providing evaluation signals which are alternatively in either a first state or a second state at a given time, said state being indicative of said level of said output signal relative to said threshold at said given time; and second circuit means coupled to said first circuit means for generating a first band signal indicative of receipt of a signal in the first band and a second band signal indicative of receipt of a signal in the second band, said first band signal being generated when said evaluation signals are in only said first state throughout a first time interval and are in only said second state throughout a third time interval, said third time interval beginning a second time interval after said first time interval ends, said second band signal being generated when said evaluation signals are in only said second state throughout said first time interval and are in only said first state throughout said third time interval.

10. The receiver of claim 6, said last named means including:

first circuit means coupled to said discriminator means for providing evaluation signals which are alternatively in either a first state or a second state at a given time, said state being indicative of said level of said output signal relative to said threshold at said given time;

second circuit means coupled to said first circuit means for generating a first status signal when said evaluation signals are in only said first state throughout a time interval and a second status signal when said evaluation signals are in only said second state throughout said time interval; and third circuit means coupled to said second circuit means for generating a first band signal indicative of receipt of a signal in the first band and a second band signal indicative of receipt of a signal in the second band, said first band signal being generated when said first status signal is generated throughout a first consecutive number of said time intervals and said second status signal is generated throughout a third consecutive number of said time intervals, said third consecutive number of said time intervals beginning a second consecutive number of said time intervals after said first consecutive number of said time intervals ends, said second band signal being generated when said second status signal is generated throughout said first consecutive number of said time intervals and said first status signal is generated throughout said third consecutive number of said time intervals.

11. The receiver of claim 10, said second circuit means comprising:

first latch means coupled to said first circuit means for generating a first latch signal which is in a third state if said evaluation signals are in said first state during any portion of said time interval and which is in a fourth state if said evaluation signals are in only said second state throughout said time interval;

second latch means coupled to said first circuit means for generating a second latch signal which is in a fifth state if said evaluation signals are in said second state during any portion of said time interval and which is in a sixth state if said evaluation signals are in only said first state throughout said time interval; and means coupled to the first and second latch means for generating (1) said first status signal when said first latch signal is in said third state while said second latch signal is in said sixth state, and (2) said second status signal when said first latch signal is in said fourth state while said second latch signal is in said fifth state.

12. The receiver of claim 6, said last named means including:

first circuit means coupled to said discriminator means for providing evaluation signals which are alternatively in either a first state or a second state at a given time, said state being indicative of the voltage of said output signal relative to said threshold at said given time;

first latch means coupled to said first circuit means for generating a first latch signal which is in a third state if said evaluation signals are in said first state during any portion of a time interval and which is in a fourth state if said evaluation signals are in said second state throughout said time interval;

second latch means coupled to said first circuit means for generating a second latch signal which is in a fifth state if said evaluation signals are in said second state during any portion of said time interval and which is in a sixth state if said evaluation signals are in said first state throughout said time interval;

first shift register means coupled to said first latch means for sequentially storing said state of said first latch signal during a first consecutive number of said time intervals;

second shift register means coupled to said first latch means for sequentially storing said state of said first latch signal during a second consecutive number of said time intervals, said second consecutive number of said time intervals beginning a third consecutive number of said time intervals after said first consecutive number of said time intervals ends;

third shift register means coupled to said second latch means for sequentially storing said state of said second latch signal during said first consecutive number of said time intervals;

fourth shift register means coupled to the second latch means for sequentially storing said state of said second latch signal during said second consecutive number of said time intervals;

second circuit means coupled to said first shift register means for generating a first hit signal if each said stored first latch signal state is said fourth state;

third circuit means coupled to said second shift register means for generating a second hit signal if each said stored first latch signal state is said fourth state;

fourth circuit means coupled to said third shift register means for generating a third hit signal if each said stored second latch signal state is said sixth state;

fifth circuit means coupled to said fourth shift register means for generating a fourth hit signal if each said stored second latch signal state is said sixth state;

sixth circuit means coupled to said second and fourth circuit means for indicating that the received signal is in the first band when said first hit signal and said third hit signal are both generated as said swept oscillator signals are swept in frequency; and seventh circuit means coupled to said third and fifth circuit means for indicating that the received signal is in the second band when said second hit signal and said fourth hit signal are both generated as said swept oscillator signals are swept in frequency.

13. A method of indicating presence of a police radar signal in one of at least two bands comprising:
generating an oscillator signal which is swept in frequency between a first frequency and a second frequency;
mixing said oscillator signal with a signal correlated to the received police radar signal to provide a primary IF signal and an image IF signal;
passing one of said image IF and primary IF signals; and
responding to said passed IF signal to indicate reception of the police radar signal and in which band the police radar signal is present.

14. A method of determining in which band of two bands of frequencies a received signal is present, the method comprising:
generating a first oscillator signal swept in frequency between a first and a second frequency correlated to a first of said two bands;
generating a second oscillator signal swept in frequency between a third and a fourth frequency correlated to a second of said two bands;
mixing a received signal with said first and second oscillator signals;
generating a primary IF signal and an image IF signal in response to either of (1) said mixing of said first oscillator signal with a received signal in the first band and (2) said mixing of said second oscillator signal with a received signal in the second band;
passing one of said primary IF and image IF signals;
generating an output signal correlated to said passed IF signal and having a level that varies (1) in a first manner from above a threshold to below said threshold in response to said passed IF signal being generated by said mixing of said first oscillator signal with a received signal in the first band and (2) in a second manner from below said threshold to above said threshold in response to said passed IF signal being generated by said mixing of said second oscillator signal with a received signal in the second band; and
generating an indicator that the received signal is (1) in the first band if said level varies in said first manner and (2) in the second band if said level varies in said second manner.

15. The method of claim 14 wherein said level is a voltage level and said threshold is a threshold voltage.

16. The method of claim 14 wherein generating an indicator comprises:
generating evaluation signals which are alternatively in either a first or a second state at a given time, said state being indicative of said level of said output signal relative to said threshold at said given time;
generating a first band signal indicative of receipt of a signal in the first band when said evaluation signals are in only said first state throughout a first time interval and are in only said second state throughout a third time interval, said third time interval beginning a second time interval after said first time interval ends; and
generating a second band signal indicative of receipt of a signal in the second band when said evaluation signals are in only said second state throughout said first time interval and in only said first state throughout said third time interval.

17. The method of claim 14 wherein generating an indicator comprises:
generating evaluation signals which are alternatively in either a first or a second state at a given time, said state being indicative of said level of said output signal relative to said threshold at said given time;
generating a first status signal when said evaluation signals are in only said first state throughout a time interval;
generating a second status signal when said evaluation signals are in only said second state throughout said time interval;
generating a first band signal indicative of receipt of a signal in the first band when said first status signal is generated throughout a first consecutive number of said time intervals and said second status signal is generated throughout a third consecutive number of said time intervals, said third consecutive number of said time intervals beginning a second consecutive number of said time intervals after said first consecutive number of said time intervals ends; and
generating a second band signal indicative of receipt of a signal in the second band when said second status signal is generated throughout said first consecutive number of said time intervals and said first status signal is generated throughout said third consecutive number of said time intervals.

18. The method of claim 17 wherein generating said status signals comprises:
generating a first latch signal which is in a third state if said evaluation signals are in said first state during any portion of said time interval and which is in a fourth state if said evaluation signals are in only said second state throughout said time interval;

generating a second latch signal which is in a fifth state if said evaluation signals are in said second state during any portion of said time interval and which is in a sixth state if said evaluation signals are in only said first state throughout said time interval;

generating a said first status signal when said first latch signal is in said third state while said second latch signal is in said sixth state;

generating a said second status signal when said first latch signal is in said fourth state while said second latch signal is in said fifth state.

19. The method of claim 14 wherein generating an indicator comprises:

generating evaluation signals which are alternatively in either a first state or a second state at a given time, said state being indicative of said level of said output signal relative to said threshold at said given time;

generating a first latch signal which is in a third state if said evaluation signals are in said first state during any portion of said time interval and which is in a fourth state if said evaluation signals are in only second state throughout said time interval;

generating a second latch signal which is in a fifth state if said evaluation signals are in said second state during any portion of said time interval and which is in a sixth state if said evaluation signals are in only said first state throughout a said time interval;

sequentially storing said state of said first latch signal during a first consecutive number of said time intervals;

sequentially storing said state of said first latch signal during a second consecutive number of said time intervals, said second consecutive number of said time intervals beginning a third consecutive number of said time intervals after said first consecutive number of said time intervals ends;

sequentially storing said state of said second latch signal during said first consecutive number of said time intervals;

sequentially storing said state of said second latch signal during said second consecutive number of said time intervals;

generating a first hit signal if each said stored first latch signal state is said fourth state during said first consecutive number of said time intervals;

generating a second hit signal if each said stored first latch signal state is said fourth state during said second consecutive number of said time intervals;

generating a third hit signal if each said stored second latch signal state is said sixth state during said first consecutive number of said time intervals;

generating a fourth hit signal if each said stored second latch signal state is said sixth state during said second consecutive number of said time intervals;

generating an indicator that the received signal is in the first band when said first hit signal and said third hit signal are both generated as said oscillator signals are swept in frequency; and generating an indicator that the received signal is in the second band when said second hit signal and said fourth hit signal are both generated as said oscillator signals are swept in frequency.

* * * * *

UNITED STATES PATENT AND TRADEMARK OFFICE
CERTIFICATE OF CORRECTION

PATENT NO. : 4,862,175

DATED : August 29, 1989

INVENTOR(S) : Michael A. Biggs and James L. Jaeger

It is certified that error appears in the above-identified patent and that said Letters Patent is hereby corrected as shown below:

Col. 6, line 11, "41 ad" should be -- 41 and --.

Col. 6, line 13, "as ill" should be -- as will --.

Col. 6, line 20, "X-ban" should be -- X-band --.

Col. 6, line 21, "utilize" should be -- utilized --.

Col. 6, line 23, after "radar" insert -- ) --.

Col. 6, line 24, before "e.g." insert -- ( --.

Col. 6, line 57, "2" should be -- 22 --.

Col. 6, line 62, before "an input" insert -- when --.

Col. 6, line 63, "emitter" should be -- limiter --.

Col. 6, line 63, before "occurs" insert -- that --.

Col. 6, line 64, before "signal" insert -- noise --.

Col. 7, line 4, "2.2." should be -- 22. --.

Col. 7, line 7, "VT" should be -- $V_T$ --.

Col. 7, line 13, "the:" should be -- then --.

Col. 7, line 21, "&he" should be -- the --.

UNITED STATES PATENT AND TRADEMARK OFFICE
CERTIFICATE OF CORRECTION

PATENT NO. : 4,862,175
DATED : August 29, 1989
INVENTOR(S) : Michael A. Biggs and James L. Jaeger It is certified that error appears in the above-identified patent and that said Letters Patent is hereby corrected as shown below:

Col. 7, line 33, "digital; logic" should be -- digital logic --.

Col. 7, line 37, after "output" insert -- Q --.

Col. 7, line 42, before "time" insert -- ( --.

Col. 7, line 49, "i:" should be -- in --.

Col. 8, line 40, "T2" should be -- $T_2$ --.

Col. 8, line 42, "T2" should be -- $T_2$ --.

Col. 14, line 57, ":n" should be -- in --.

Signed and Sealed this

Fourth Day of September, 1990

Attest:

HARRY F. MANBECK, JR.

*Attesting Officer*   *Commissioner of Patents and Trademarks*